May 24, 1966 K. P. WORCESTER 3,253,211
FREQUENCY-CONTROL SYSTEM
Filed Jan. 8, 1963 3 Sheets-Sheet 2

INVENTOR:
KENNETH P. WORCESTER,
BY Luther P. Speck
Attorney.

INVENTOR:
KENNETH P. WORCESTER,
BY Luther P. Speck
Attorney.

United States Patent Office 3,253,211
Patented May 24, 1966

3,253,211
FREQUENCY-CONTROL SYSTEM
Kenneth P. Worcester, Tempe, Ariz., assignor to The Garrett Corporation, Los Angeles, Calif., a corporation of California
Filed Jan. 8, 1963, Ser. No. 250,175
8 Claims. (Cl. 322—32)

This invention relates to frequency-control apparatus, and pertains more specifically to closed-loop servo systems incorporating an alternator driven by a prime mover as a source of variable frequency to be controlled. Among the more important features of control systems embodying this invention are exceptional sensitivity to frequency deviations of the order of a fraction of a cycle of the frequency to be controlled, and high immunity to regenerative oscillations in the servo control loop. In general, the sensitivity of the frequency control system of this invention to incipient fluctuations in the frequency of the signal to be controlled is attributable to the novel expedient of multiplying a sample of the variable frequency signal to produce a product signal, and then heterodyning the product signal with a constant-frequency reference signal in order to produce a lower sideband, or difference, signal. As a result, a deviation of one cycle in the variable frequency signal will produce a corresponding variation of several cycles in the difference signal. The superior stability of the closed servo loop utilized in the frequency-control system is attributable mainly to the use of a unique magnetic amplifier having a response-time characteristic somewhat slower than that of the source of variable signal to be controlled.

In an actual embodiment of the frequency-control system of this invention, the source of variable frequency signal is a turbine-driven alternator. The source of constant-frequency reference signal is a tuning-fork oscillator, and the means for effecting control of the variable signal frequency is a fuel by-pass valve driven by a servomechanism in order to regulate the speed of the turbine and hence, the variable output frequency of the alternator.

Prior to this invention, closed-loop servo systems for controlling frequency have utilized a constant-frequency signal source as a standard to which a variable frequency signal is to be compared and regulated. In the usual system, the standard and variable frequencies are compared in a phase detector in order to produce an error signal whenever the variable frequency differs in phase from the standard frequency. The resulting error signal, if any, then actuates appropriate servo-control apparatus to reduce the error signal to zero by changing the frequency of the variable signal until it equals the standard frequency.

Another known frequency-control system achieves somewhat greater sensitivity to frequency deviations by generating a constant-frequency reference signal differing in frequency by a predetermined magnitude from the correct frequency of the variable signal, heterodyning the reference and variable signals to produce a lower sideband frequency, detecting fluctuations of the lower sideband frequency from a predetermined correct value in a frequency discriminator in order to produce an error signal, and then utilizing the error signal to actuate a servo-control device to correct the variable signal frequency, restore the lower sideband signal frequency to its predetermined value, and reduce the error signal effectively to zero.

The prior art has found it difficult to increase the sensitivity of conventional frequency-control systems enough to render them responsive to frequency deviations smaller than a few cycles Furthermore, serious problems have been encountered in designing stable servo systems for controlling the variable-frequency output signals of turbine or engine-driven alternators. On account of the high inertial masses of the prime mover and alternator, these systems inherently are slow to respond to frequency corrective measures. For this reason close regulation of their output signal frequency requires highly-sensitive means for detecting incipient frequency deviations. Moreover, a closed-loop servo system for effecting frequency-corrective action must have an even slower response time in order to minimize the possibility of producing regenerative oscillations, a phenomenon manifested in excessive-corrective action of the servomechanism with consequent overshoot of the correct frequency.

The need for a frequency-control system capable of regulating the output frequency of turbine-alternator generator sets recently has been intensified as a result of the growing interest evinced in the use of alternators driven by high-speed gas turbines to produce on site, 400-cycle alternating-current electrical power for use in buildings, shops, and other installations where significant amounts of power at these frequencies may be utilized effectively. The need for precise control over the frequency of alternating-current electrical power is well understood and must be provided, for example, so that clocks, machines, and other equipment driven by constant-speed synchronous motors and similar apparatus will operate satisfactorily. Accordingly, it is important that turbo-generator sets designed for general acceptance and wide use be equipped with a highly precise and reliable system for controlling output frequency within narrow limits, notwithstanding wide and abrupt fluctuations in load.

This invention provides a frequency-control system utilizing the heterodyne technique mentioned above, but incorporating unique improvements which assure sensitivity and stable corrective response to frequency errors on the order of fractional parts of a cycle.

An actual embodiment of the frequency control system of this invention utilizes to full advantage the low impedance input and output characteristics of transistor circuitry and magnetic amplifiers, and generally comprises a reference-signal source having a constant frequency of 3200 cycles per second, a turbine-driven alternator for producing variable but controllable frequency electrical power having a correct frequency of 400 cycles per second, and control apparatus including a servomechanism for maintaining the alternator at the correct 400-cycle frequency.

The control apparatus comprises a band-pass filter for selecting the seventh harmonic of the variable signal, a push-pull diode mixer inductively coupled to the reference and harmonic signal sources via transistorized buffer amplifiers, a low-pass filter network for translating selectively the lower sideband, or difference signal output of the mixer via a push-pull buffer amplifier to a transistorized frequency discriminator utilizing a frequency-responsive phase shifter network to produce an alternating control signal, a degeneratively-biased magnetic amplifier coupled to the frequency discriminator and responsive to the control signal for producing a time-spaced, alternate-polarity series of pulses of reversible phase and variable amplitude whenever the variable-frequency signal deviates from the correct frequency, a 90-degree phase-shifting and smoothing network coupled to the output of the magnetic amplifier for developing a smoothly alternating error signal in phase with the variable signal, a resistance bridge network including a follow-up potentiometer for adding the alternating error signal to a sample of the variable signal to produce a servo input signal, a servo amplifier coupled to the resistive bridge network, and a servomotor coupled to the follow-up potentiometer and to the control element of a fuel bypass valve for the turbine, so that corrective response of the servomotor adjusts the fuel bypass valve of the turbine and simultaneously adjusts the follow-up potentiometer of the bridge in the direction required to cancel the servo-input signal.

Accordingly the important objectives of this invention include the provision of:

(1) A frequency-control system characterized by exceptional sensitivity to frequency deviations on the order of fractions of a cycle;

(2) A closed-loop servo system for controlling the frequency of a variable signal, and characterized by exceptional stability, and by sensitivity to frequency deviations of the variable signal on the order of fractions of a cycle;

(3) A closed-loop servo system for controlling the frequency of a controllable signal normally subject to frequency variations, and utilizing novel transistorized and magnetic-amplifier circuitry to achieve relative simplicity, light weight, reliability, sensitivity to frequency variations on the order of a fraction of a cycle, and freedom from regenerative oscillations in the servo loop;

(4) A closed-loop servo system for controlling the frequency of a variable-frequency signal, and characterized by sensitivity to incipient variations in the frequency of the variable signal achieved principally through the use of means for developing a difference frequency by heterodyning a reference signal of constant frequence with a product signal derived effectively by multiplying a sample of the variable signal, so that a variation of one cycle in the frequency of the variable signal will produce a resultant variation of several cycles in the frequency of the difference signal;

(5) A closed-loop servo system for controlling the frequency of a variable signal source, and characterized by sensitivity to variations in the frequency of the variable signal on the order of fractions of a cycle attributable mainly to the use of means for developing a difference frequency by heterodyning a reference signal of constant frequency with a product signal derived effectively by multiplying a sample of the variable signal, and by virtual immunity to regenerative oscillations in the closed-loop servo system achieved principally through the use of a unique, degeneratively-biased magnetic amplifier having a response period exceeding that of the tubine-driven alternator constituting the source of variable signal; and (6) A closed-loop servo system for controlling the frequency of a controllable signal source comprising apparatus of superior economy and engineering simplicity for achieving the aforestated objectives.

The preceding text is intended to summarize and explain the significance of this invention in relation to the problems which it resolves. For a more complete understanding of the structure, operation, and novel features of the preferred embodiment consider the following description with reference to the drawings wherein.

Figure 1:
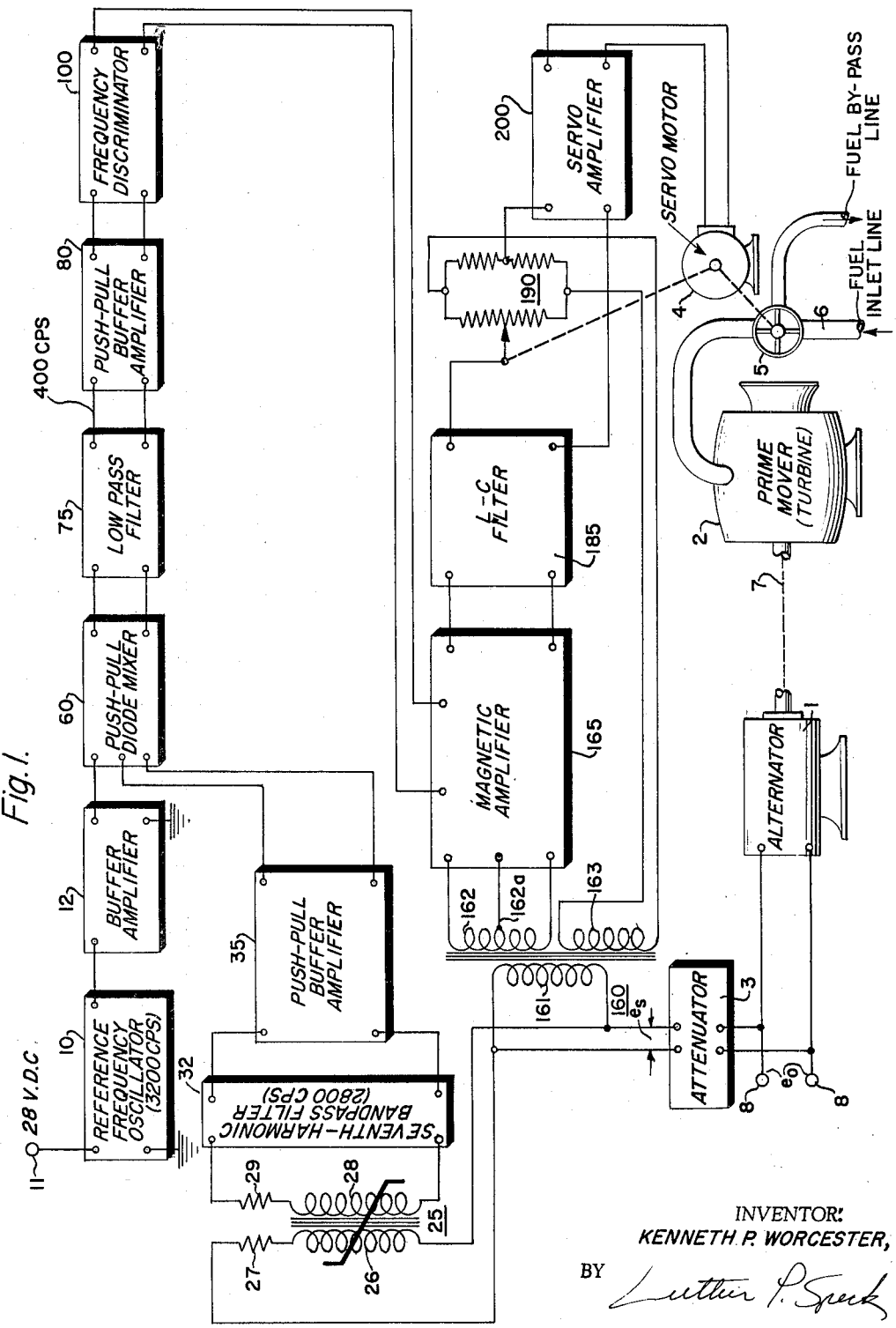
FIG. 1 is a schematic-block diagram representing the inter-relationship of the principal components of a preferred embodiment of the frequency-control system of this invention.

As represented in FIG. 1, the frequency-control system of this invention generally comprises a source of electrical alternating power made up of an alternator 1 driven by prime mover 2, in this case a gas-driven turbine via the mechanical coupling 7. The output power of alternator 1 has a voltage component $e_o$ of variable and controllable frequency. A sample of the variable alternator voltage $e_o$ is derived through use of an attenuator 3 formed, for example, of resistors of suitable rating to produce a variable signal $e_s$ for use in controlling the variable frequency of $e_o$ via a unique, closed-loop servo system including a servomotor 4 coupled to an adjustable fuel bypass valve 5 provided in the fuel inlet line 6 of turbine 2. The function of the closed-loop servo system is to maintain the variable-frequency signal $e_s$ at a predetermined frequency of 400 cycles per second by effecting changes in the speed of turbine 2 through appropriate adjustments made to the fuel bypass valve 5.

The closed-loop servo system generally comprises a reference-frequency oscillator 10 for producing a reference signal having a constant frequency of 3200 cycles per second, and a band-pass filter 32 supplied with the variable frequency signal $e_s$ via a voltage stepdown transformer 25. The band-pass filter 32 is designed to pass components of $e_s$ having frequencies of 2800 cycles per second, a product frequency seven times the correct 400-cycle frequency of $e_s$. The reference-frequency and product-frequency signals then pass, via buffer amplifiers 12 and 35, respectively, to mixer 60 where they combine in well known manner to produce an upper sideband, or sum, signal having a frequency of 6000 cycles per second, and a lower sideband, or difference, signal having a frequency of 400 cycles per second. For reasons explained below, only the 400-cycle difference signal is utilized. The 6000-cycle upper sideband is eliminated through the use of a low-pass filter 75.

It is important to notice that the difference signal will have a correct frequency of 400 cycles per second only when the variable signal $e_s$ is correct. Furthermore, a deviation in the frequency of $e_s$ of one cycle for example will produce a deviation in frequency of the difference signal or seven cycles, Stated otherwise, a one percent, or four cycle, fluctuation in $e_s$ will produce a seven percent, or 28-cycle fluctuation in the difference signal.

From the foregoing it should be apparent that variations in the frequency of $e_s$ appear to be amplified in their effect on the difference signal. Moreover the magnitude of the apparent amplification will be a function of the factor used in effectively multiplying the frequency of $e_s$, as well as the relation between the respective frequencies of $e_s$ and the difference signal. For example, several stages of multiplication could be used in lieu of the 2800-cycle band-pass filter 32, so that $e_s$ could be multiplied effectively by a factor much larger than seven. In this event, a reference frequency oscillator having a much larger frequency than the 3200-cycle oscillator 10 also would be provided in order to develop a difference frequency of appropriate magnitude at mixer 60. If all other signal frequencies of the embodiment of FIG. 1 remain the same, the effect of a reduction in the frequency of the reference-frequency oscillator 10 from 3200 to 3000 cycles per second would be to reduce the difference frequency to 200 cycles per second. As a result a one percent change in $e_s$ would produce a 14 percent change in the 200-cycle per second difference signal. Instead of decreasing the difference signal frequency by reducing the frequency of the reference oscillator 10, the same result could be achieved merely by increasing the frequency of reference oscillator 10 to 6000 cycles per second, and multiplying $e_s$ by a factor of 14 instead of seven. If this were to be done, a change in $e_s$ of one cycle per second would result in a change of the 400-cycle difference frequency of 14 cycles per second.

Figure 3A:
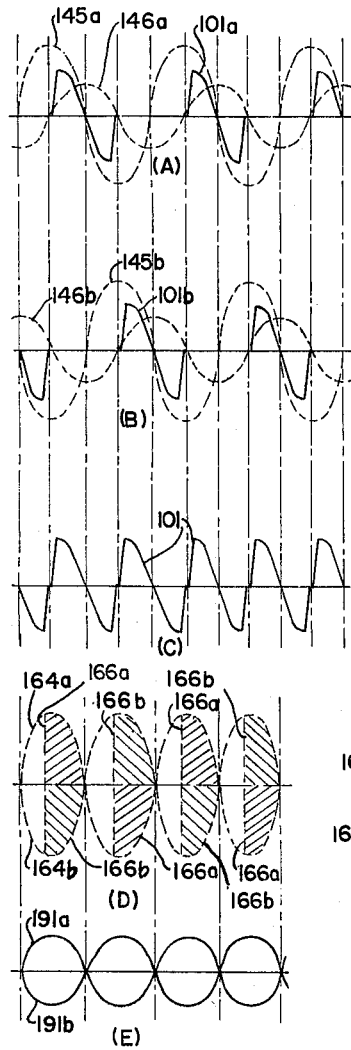
FIGS. 3a, 3b, and 3c portray idealized signal waveforms helpful in explaining the operation of the frequency-control system.
Figure 3B:
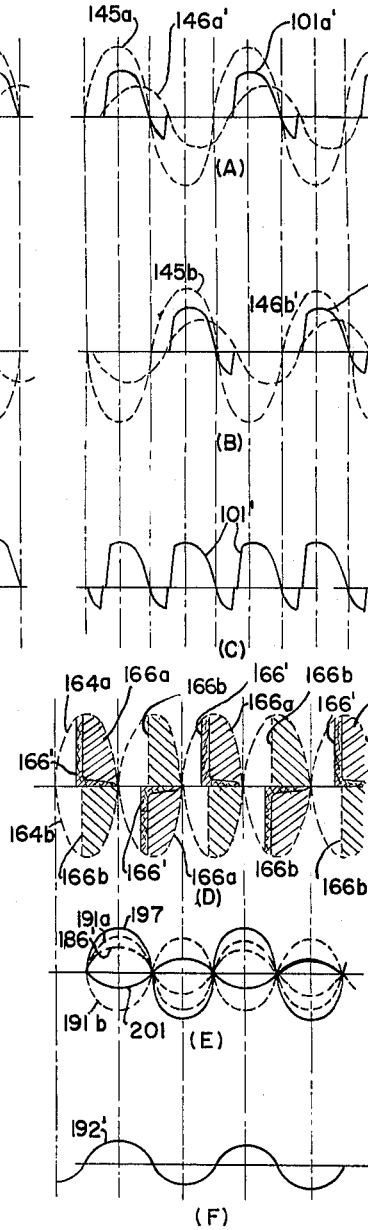
Figure 3C:
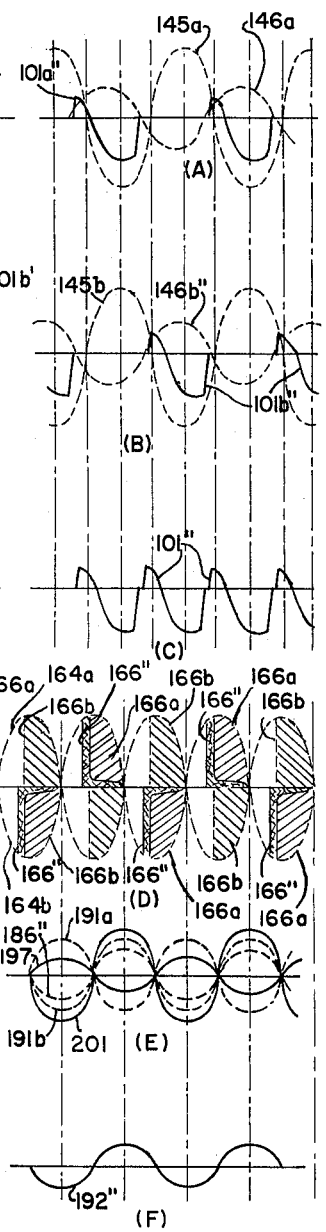

From the low-pass filter 75, the difference signal passes, via the push-pull buffer amplifier 80 to a unique frequency discrimiinator 100. When the difference signal output of mixer 60 is correct, the frequency discriminator 100 produces a balanced alternating control signal 101, FIG. 3a, curve C. On the other hand, when the difference signal developed at mixer 60 is incorrect, either the positive or negative half cycle of the control signal will predominate. As shown in FIGS. 3b and 3c, curve C, the predominance of one half cycle of the control signal will result in unbalanced alternating signals 101' and 101'' wherein the predominant half cycle will result in an effective direct-current component having a polarity representing the direction, and a magnitude representing the extent of deviations from the 400-cycle per second correct frequency of the difference signal.

The control signal from frequency dicriminator 100 is supplied to a unique magnetic amplifier 165. The magnetic amplifier 165 also receives the variable signal $e_s$ via a coupling transformer 160, and develops a time-spaced, alternate polarity series of output pulses 166, FIGS. 3b and 3c, curves D, of reversible phase and variable amplitude only in response to unbalanced control signals 101' or 101" (FIGS. 3b and 3c, curves C) received from frequency discriminator 100. When the alternate half cycles of the control signal 101 are equal or balanced, as shown in FIG. 3a, curve C, the output of magnetic amplifier 165 is zero. When the magnetic amplifier 165 produces output-signal pulses 166 in response to an unbalanced control signal, the phase of the output pulses represents the direction and their width represents the extent of difference-frequency error.

The output pulses 166 then pass to an inductance-capacitance filter 185 where they are smoothed and delayed in phase by 90 degrees to produce a continuous-wave alternating error signal 186 (FIGS. 3b and 3c, curves E) either in phase or 180 degrees out of phase with $e_s$. The error signal 186 then passes to the bridge 190 where it is added to one and subtracted from the other of the push-pull components 191a and 191b (FIGS. 3a, 3b, and 3c, curves E) to produce a composite servo control signal 192 (FIGS. 3a and 3b, curves F), having a phase representing the direction and an amplitude representing the extent of deviation from the correct 400-cycle difference frequency. The servo signal 192 then passes to the servo amplifier 200 which utilizes it to control electrical power for actuating servomotor 4. The response of servomotor 4 adjusts the fuel bypass valve 5 to change the speed of turbine 2 and alternator 1 in the direction required to eliminate the frequency deviation of variable signal $e_s$.

Figure 2:
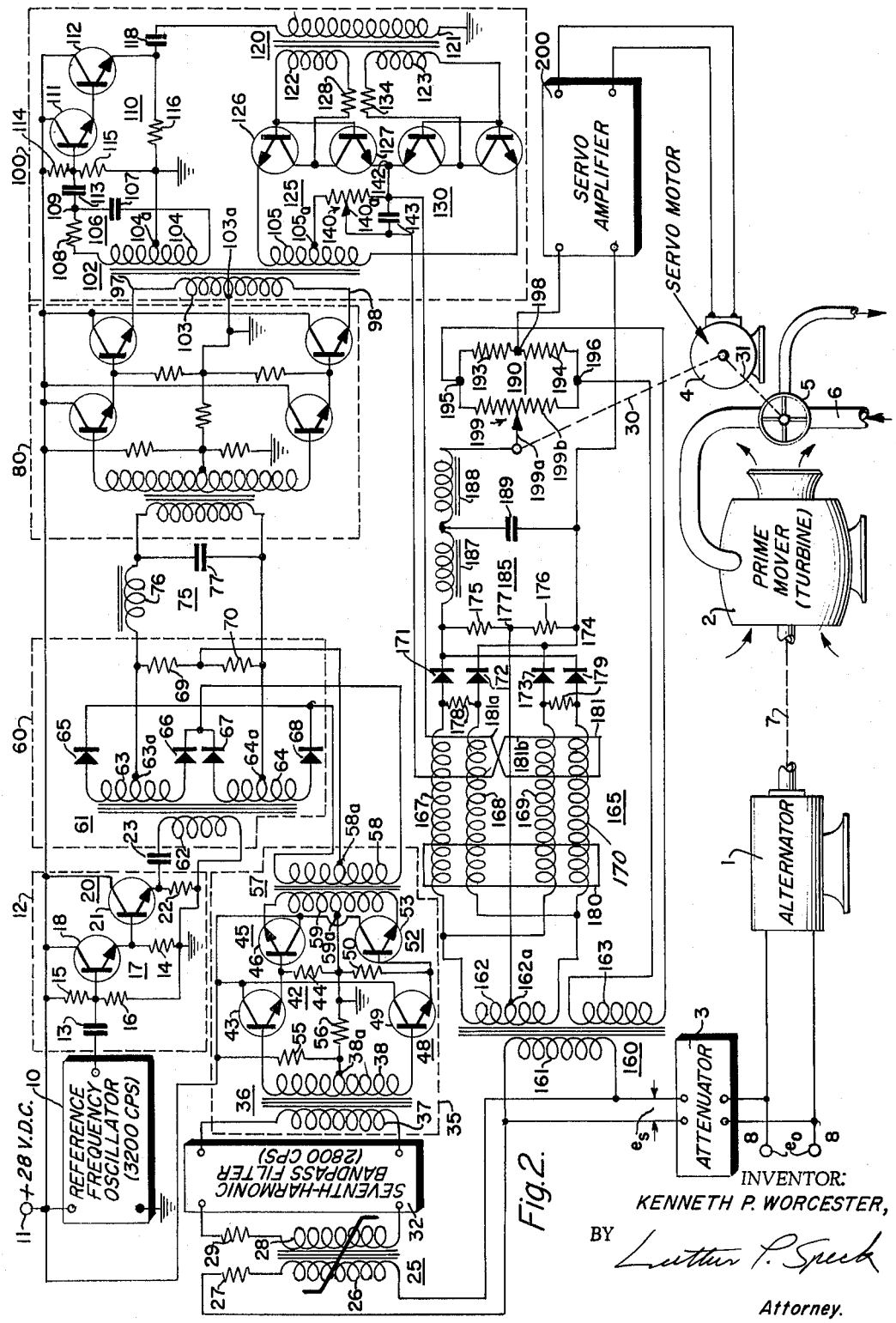
FIG. 2 represents schematically the frequency control system depicted in FIG. 1.

The error-sensing circuitry comprising various blocks of the frequency-control of FIG 1 is represented schematically in FIG. 2. The control circuitry of the closed-loop servo system is supplied with direct-current voltage of positive polarity at terminal 11.

The reference-frequency oscillator 10 may be any one of several well known types of apparatus for generating a signal of constant 3200-cycle per second frequency. For example, the oscillator 10 may be a crystal-controlled oscillator or one controlled by tuning fork. In an actual embodiment, the reference-frequency oscillator 10 was of the latter type.

The buffer amplifier 12 provides enough isolation between the reference-frequency oscillator 10 and the push-pull diode mixer 60 to prevent variable load effects during operation of the latter from affecting the former. In general, buffer amplifier 12 comprises first and second direct-coupled emitter followers 17 and 20. The first emitter follower 17 is made up of an NPN transistor 18 having its base coupled via blocking capacitor 13 to the output terminal of the reference-frequency oscillator 10, its emitter coupled via a degenerative feedback resistor 14 to a ground source of constant reference potential, and its collector coupled to the positive-voltage supply terminal 11. Appropriate positive bias and temperature stabilization is provided by a voltage divider made up of series-connected resistors 15 and 16 coupled between the positive-voltage input terminal 11 and the ground source of constant potential.

The second emitter follower 20 likewise is made up of an NPN transistor 21 having its base coupled directly to the emitter of transistor 18, its emitter coupled via a degenerative feedback resistor 22 to the ground source of constant potential, and its collector coupled directly to the positive-voltage supply terminal 11.

The reference-frequency output signal of buffer amplifier 12, developed across the degenerative feedback resistor 22, is coupled to the push-pull diode mixer 60 via blocking capacitor 23 to insure that the reference signal will be free of direct-current components that otherwise might deleteriously affect the inductive-coupling characteristics of mixer 60.

The push-pull diode mixer 60 is comprised of a transformer 61 having a primary winding 62 coupled between the blocking capacitor 23 and the ground source of constant potential, and two center-tapped secondary windings 63 and 64. Two semiconductor diodes 65 and 66 have their respective anodes coupled to separate extremities of secondary winding 63, and semiconductor diodes 67 and 68 have their respective anodes coupled to the separate extremities of secondary winding 64. When the seventh harmonic of the sample $e_s$ of the variable-frequency output voltage $e_o$ of alternator 1, developed by the 2800-cycle per second band-pass filter 32, is applied to the respective cathodes of semiconductors 65, 66, 67, and 68 in the manner described below, push-pull components of the sum and difference signals are developed across the series-connected resistors 69 and 70 coupled between the respective center taps 63a and 64a of secondary windings 63 and 64. The push-pull components of the sum signal are eliminated through use of a low-pass inductance-capacitance filter 75 made up of an inductor 76 and capacitor 77 coupled effectively in series between the center taps 63a and 64a. The variable difference signal of about 400 cycles per second is developed across the capacitor 77.

As described above, the seventh harmonic of a sample $e_s$ of the variable-frequency output voltage $e_o$ of alternator 1 is provided to mixer 60 through use of a step-down transformer 25, 2800-cycle per second band-pass filter 32, and push-pull buffer amplifier 35. The coupling transformer 25 has a primary winding 26 coupled effectively in series with a voltage-dropping resistor 27 across the output terminals 8 of alternator 1. The secondary winding 28 is coupled via current-limiting resistor 29 to a band-pass filter 32 of conventional design for translating selectively a frequency band centered at about 2800 cycles per second; that is, the seventh harmonic of the 400-cycle per second variable signal sample $e_s$.

The push-pull buffer amplifier 35 is comprised of a coupling transformer 36 having a primary winding 37 coupled across the output terminals of the seventh-harmonic band-pass filter 32, and a center-tapped secondary winding 38; and two channels of direct-coupled emitter-follower amplifiers for the respective push-pull components of the variable seventh-harmonic signal developed across the secondary winding 38. One channel is formed by direct-coupled first and second emitter followers 42 and 45. The first emitter follower 42 of this channel is made up of an NPN transistor 43 having a base coupled directly to one extremity of the secondary winding 38, an emitter coupled to the ground source of constant potential via a degenerative feedback resistor 44, and a collector coupled to positive-voltage supply terminal 11. The second emitter follower 45 is made up of an NPN transistor 46 having its base coupled directly to the emitter of transistor 43 and its collector coupled directly to the positive-voltage supply terminal 11.

The other emitter-follower channel of buffer amplifier 35 is formed by third and fourth direct-coupled emitter followers 48 and 52 respectively. The third emitter follower 48 is made up of NPN transistor 49 having its base coupled to the other extremity of the secondary winding 38, its emitter coupled to a ground source of constant reference potential via a degenerative feedback resistor 50, and its collector coupled to the positive-voltage supply terminal 11. The fourth emitter follower 52 is made up of NPN transistor 53 having its base coupled directly to the emitter of transistor 49, and its collector coupled directly to the positive-voltage supply terminal 11. A voltage divider made up of series-connected resistors 55 and 56 is coupled between the positive-voltage supply terminal 11 and the ground source of constant reference potential.

A junction between resistors 55 and 56 is coupled directly to the center tap 38a of secondary winding 38 to provide a common source of positive base-bias voltage for the respective bases of transistors 43 and 49. An output transformer 57 has a center-tapped secondary winding 58 and a center-tapped primary winding 59 coupled between the respective emitters of transistors 46 and 53. The center tap 59a of the primary winding 59 is coupled to the ground source of constant reference potential. The center tap 58a of the secondary winding 58 is coupled to a junction between output resistors 69 and 70 of mixer 60 in order to provide an effective ground reference potential for the seventh-harmonic signal output of buffer amplifier 35, and for the difference signal output of mixer 60. One extremity of secondary winding 58 is coupled to the cathodes of semiconductor diodes 66 and 67, and the other extremity is coupled to the cathodes of semiconductor diodes 65 and 68. Inasmuch as the manner in which alternating signals combine to produce sum and difference frequency signals is well known, a description of the operation of mixer 60 is omitted.

The variable-frequency, difference-signal output of mixer 60 passes via the push-pull buffer amplifier 80 to the unique frequency discriminator 100. The buffer amplifier 80 is essentially the same in function and structure as the buffer amplifier 35 described above. Accordingly, a description of buffer amplifier 80 is omitted in the interest of expediency.

The frequency discriminator 100 develops an alternating control signal having twice the frequency of the difference signal. When the frequency of the difference signal is correct, in this instance 400 cycles per second, the alternate half cycles of the 800-cycle per second control signal 101 (FIG. 3a, curve C) effectively are equal. However, when the frequency of the difference signal exceeds 400 cycles per second the magnitude of the half cycles of one polarity will exceed those of the opposite polarity. Likewise, half cycles of the opposite polarity will predominate when the frequency of the difference signal is below 400 cycles per second.

The discriminator 100 comprises several principal components. Among these is an input transformer 102 for coupling inductively the difference signal output of amplifier 80 to the frequency discriminator 100, and providing first and second replicas of the difference signal, a phase shift network 106 for shifting the phase of the first replica through an angle on the order of 90 degrees with respect to the second replica, a two-stage emitter-follower 110 to provide isolation between the phase-shifting network 106, and the following circuitry, and two bi-directional, dual-transistor switches 125 and 130 coupled effectively in the respective circuit paths of the push-pull components of the second replica of the difference signal together with potentiometer 140, and operable in response to positive half cycles of each of the push-pull components of the shiftable-phase first replica developed by an output transformer 120 coupled between the emitter-follower amplifier 110 and the respective controlling elements of dual-transistor switches 125 and 130.

The input transformer 102 has a center-tapped primary winding 103 coupled between the output leads 97 and 98 of the push-pull buffer amplifier 80, and first and second center-tapped secondary windings 104 and 105 for developing first and second replicas, respectively, of the difference signal input to primary winding 103. The center tap 103a of the primary winding 103 is grounded.

Inasmuch as the two dual-transistor switches 125 and 130 are alike, only switch 125 will be described. This switch is comprised of two NPN transistors 126 and 127 having their collectors intercoupled directly, and their bases likewise intercoupled directly, so that their respective collector-emitter paths are series-connected and conduction may occur di-directionally whenever their respective base-emitter junctions are forwardly biased simultaneously. The switch 125 is coupled in series with potentiometer 140 between the center tap 105a and one extremity of the second secondary winding 105 of input transformer 102, and switch 130 likewise is coupled in series with potentiometer 140 between the center tap 105a and the other extremity of the second secondary winding 105. The alternating control-signal output of the frequency discriminator 100 is developed between the wiper arm 140a of potentiometer 140 and the junction 142 common to switches 125 and 130. A capacitor 143 is coupled between wiper arm 140a and junction 142 to eliminate undesirable harmonics from the control signal.

From the foregoing it should be apparent that the directions of current flow through switches 125 and 130 will be determined by respective push-pull components of the fixed-phase replica of the difference signal developed by the second secondary winding 105 across their respective collector-emitter paths, and the "on" times of the switches will occur on positive half cycles of the shiftable-phase replica developed on their respective base elements.

The shiftable-phase replica of the difference signal is developed by the combination of the first secondary winding 104 and the resistance-capacitance phase-shifting network 106. This network comprises a capacitor 107 and a resistor 108 coupled in series between the extremities of the first secondary winding 104. The phase-shift replica of the difference signal is developed at a junction 109 common to the resistor 108 and capacitor 107. The center tap 104a of the first secondary winding is grounded, and the parameters of the phase-shifting network 106 are chosen so that the phase of the resulting difference-signal replica will be shifted through an angle of 90 degrees with respect to the fixed-phase replica developed across switches 125 and 130 when the frequency of the difference signal is correct, or in this embodiment, 400 cycles per second. When the difference signal frequency is below the correct frequency, the resulting phase shift will be less than 90 degrees, and when it exceeds the correct frequency, the resulting phase shift will be greater than 90 degrees.

The two-stage emitter-follower amplifier 110, made up of NPN transistors 111 and 112 is coupled to the output junction 109 of the phase-shifting network 106 to insure that spurious electrical events will be isolated from the former. The shiftable-phase replica is applied to the base of transistor 111 via blocking capacitor 113. Appropriate positive base-biasing voltage and temperature compensation is provided by coupling the base of transistor 111 to a common junction of series-connected resistors 114 and 115 coupled between the positive-voltage supply terminal 11 and the ground source of constant reference potential. The collector of transistor 111 is coupled directly to positive voltage supply terminal 11, and its emitter is coupled to the base of transistor 112. The collector of the latter is coupled directly to the positive-voltage supply terminal 11, and its emitter is coupled to the ground source of constant reference potential via the degenerative feedback resistor 116.

The shiftable-phase replica of the difference signal developed across the degenerative feedback resistor 116 passes via a blocking capacitor 118 to one extremity of the primary winding 121 of an output transformer 120. The other extremity of the primary winding 121 is coupled to the ground source of constant reference potential. The output transformer 120 has first and second secondary windings 122 and 123 respectively. One extremity of the first secondary winding 122 is coupled directly to the bases, and the other extremity is coupled via a current-limiting resistor 128 to the collectors of the bi-directional, dual-transistor switch 125. The second secondary winding 123 is coupled to the other switch 130 via current-limiting resistor 134 in a similar manner, except that the polarities at any instant are opposite those on corresponding elements of the switch 125. Accordingly, the bases of switch 125, for example, will be positive and the switch will be "on" during one-half cycle of the shiftable-phase replica, and the bases of the other switch 130 will be positive and the switch will be "on" during the next half cycle of the shiftable-phase replica.

The frequency-responsive phase-shifting and switching operation of the frequency discriminator 100 will be explained with reference to FIGS. 3a, 3b, and 3c, curves A, B, and C, respectively. The waveforms of FIG. 3a, for curves A, B and C for example, exemplify the signal states when the difference frequency is correct, and corresponding curves A, B, and C of those of FIGS. 3b, and 3c represent the way that unbalanced alternating control signals are developed when the difference signal is, respectively, below and above the correct 400-cycle per second difference frequency. Curves A and B of these FIGS. 3a, 3b, and 3c are drawn on a common time base to show the on-off operation of the bi-directional, dual-transistor switches 125 and 130, and curves C drawn on the same time base, shows how the operation of these switches on alternate half cycles of the phase-shiftable replica of the difference signal results in the development of the composite alternating control signal across potentiometer 140.

Consider first the operation of the phase discriminator 100 when the difference frequency is correct. The push-pull components of the fixed-phase replica of the difference signal developed at the extremities of the second secondary winding 105 are represented by the dotted waveforms 145a and 145b of FIG. 3a, curves A and B respectively, and the push-pull components of the shiftable-phase replica provided by the secondary windings 122 and 123 of output transformer 120 are represented by the dotted waveforms 146a and 146b shown to be in phase quadrature with respect to the waveforms 145a and 145b of the fixed-phase replica.

The bi-directional, dual-transistor switches 125 and 130 are "on" during positive half cycles of the push-pull components of the shiftable-phase replica, waveforms 146a and 146b. Hence, currents of alternate polarity flow in succession through each of the switches during each of the positive half cycles of the components 146a and 146b. The bi-directional current through switch 125 is represented, for example, by waveform 101a of curve A, and the bi-directional current through switch 130, flowing during the "off" interval of switch 125, is represented by waveform 101b of curve B as represented in FIG. 3a, curve C. The bi-directional currents 101a and 101b flowing alternately through switches 125 and 130 combine across potentiometer 140 to form a composite alternating control signal represented in FIG. 3a, curve C, by waveform 101. Thus, when the 400-cycle, correct difference frequency is received by frequency discriminator 100, the latter develops a control signal having equal half cycles of opposite polarity, and a frequency twice that of the correct difference frequency, in this instance 800 cycles per second.

The signal states existing in frequency discriminator 100 when the difference frequency is below the correct frequency are represented by the waveforms of FIG. 3b, curves A, B, and C. The push-pull components 145a and 145b of the fixed-phase replica of the difference signal remain unchanged, but the push-pull components 146a' and 146b' of the shiftable phase replica are now displaced less than 90 degrees with reference to the fixed-phase components. Under these circumstances, as shown by the current waveforms 101a' and 101b', more positive than negative current flows through the bi-directional switches 125 and 130 during their respective "on" periods. As a result the waveform 101' of the composite control signal developed across potentiometer 140 will be characterized by predominating positive half cycles.

In a similar manner, but with the push-pull components 146a" and 146b" (FIG. 3c, curves A and B) of the shiftable-phase replica displaced more than 90 degrees with respect to the push-pull components 145a and 145b of the fixed-phase replica, a control signal having predominating negative half cycles like that represented by waveform 101" (FIG. 3c, curve C) is developed.

The alternating control-signal output of the frequency discriminator 100 is utilized to control the operation of a unique magnetic amplifier 165. As explained above, magnetic amplifier 165 fulfills the functional requirements of integrating effectively error-representative control signals developed by the frequency discriminator 100 during a time interval slightly longer than the composite response time of alternator 1 and turbine 2 to a correctional change in the opening of the fuel bypass valve 5. In an actual embodiment of the frequency-control system represented in the drawings, the integrating time constant of magnetic amplifier 165 is about 10 seconds. The desirability of making the response time for the frequency-control system slightly longer than that of the turbogenerator formed by turbine 2 and alternator 1 will be understood by those skilled in the art as being necessary in order to safeguard against regenerative error-signal feedback and consequent oscillation of the system.

In addition to a relatively long response time, the magnetic amplifier 165 is characterized further by its capacity to develop, in response to unbalanced control signals like those represented in waveforms 101' and 101", FIGS. 3b and 3c, curves C, time-spaced width-modulated pulses 166' and 166" of alternating polarity. The pulses 166' and 166" have a phase representing the direction, and respective durations representing the magnitude, of deviation of the variable-frequency signal $e_s$ from its correct frequency of 400 cycles per second.

The magnetic amplifier 165 receives a portion of the variable-frequency signal $e_s$ via a coupling transformer 160 having a primary winding 161 coupled effectively, via attenuator 3, across the output terminals 8 of alternator 1, and first and second secondary windings 162 and 163, respectively. The first secondary winding 162 is coupled directly to the magnetic amplifier 165, and the second secondary winding 163 is coupled across a resistor bridge 190. This provides means for adding the alternating error signal to the push-pull components of the variable signal $e_s$ to produce one or the other of servo-control signals 192' and 192", FIGS. 3b and 3c, curves F.

The magnetic amplifier 165 is comprised of saturable-reactor gate windings 167 and 169 having their input ends coupled to one extremity of the first secondary winding 162, and their respective output ends coupled via semiconductor diodes 171 and 173 across the series-connected output resistors 175 and 176; and saturable-reactor gate windings 168 and 170 having their input ends coupled to the opposite extremity of the first secondary winding 162 of coupling transformer 160, and their output ends coupled via semiconductor diodes 172 and 174 across the series-connected output resistors 175 and 176. A mid-junction 177 comon to output-resistors 175 and 176 is coupled directly to a center-tap 162a of the first secondary winding 162 of coupling transformer 160. A biasing resistor 178 coupled across the output ends of gate windings 167 and 168, provides a current path for resetting the saturable core (not shown) of each of the gate windings in response to negative half-cycles of $e_s$ occurring alternately at their respective input ends. A second biasing resistor 179 provides for resetting the saturable cores (not shown) of gate windings 169 and 170 in like manner.

A short-circuited winding 180 disposed in inductive relation to gate windings 167, 168, 169 and 170 provides means for developing a degenerative self-biasing flux in their respective cores (not shown), and a control winding 181 regulates the output of magnetic-amplifier 165 by controlling the occurrence of flux saturation in the gate-winding cores (not shown) in response to the alternating control-signal output of frequency discriminator 100. Gate windings 167 and 168 comprise a first magnetic-amplifier channel in push-pull relation with a second magnetic-amplifier channel made up of gate windings 169 and 170. Moreover, the control winding 181 has a first section 181a wound around the cores (not shown) of gate windings 167 and 168 in one direction, and a second section 181b wound around the cores of gate windings 169 and 170 in the opposite direction. As a result, control signals having effective direct-current components, like 101' and 101", will increase the flux developed in the cores of one of the magnetic amplifier channels while decreasing the flux in the other, and vice versa. When the variable-frequency signal $e_s$ is correct, the half cycles of the control signal will be equal, as shown by curve C of FIG. 3a. Under these conditions, the control signal will not have a direct-component, and the flux developed in the gate-winding cores of both channels will remain unaffected and equal.

The operation of the magnetic amplifier 165 will be explained with reference to FIGS. 3a, 3b and 3c, curves D, E, and F, respectively. First assume that the variable-frequency signal $e_s$ is correct, so that the control signal 101 supplied to the control winding 181 from frequency discriminator 100 will have equal positive and negative half cycles. As represented in FIG. 3a, curve D, the magnetic amplifier 165 will not produce an output signal under these conditions because its push-pull upper and lower channels develop equal potentials of the same polarity across the output resistors 175 and 176. This is the case because the control signal 101 has no significant effect on the electromagnetic flux developed in the gate-winding cores (not shown), and a positive half cycle 164a (FIG. 3a, curve D), developed on the upper extremity of secondary winding 162, produces a first current through gate winding 167, diode 171, and output resistor 175 of the first magnetic-amplifier channel, and a second current, equal to and in the same direction as the first current, through gate winding 169, diode 173, and output resistor 176 of the second amplifier channel. In this manner, simultaneous pulses 166a and 166b of equal amplitude, opposite polarity, and of a duration extending to the end of the half cycles of push-pull components 164a and 164b, are developed across output resistors 175 and 176. As a result, the magnetic amplifier 165 does not produce an output signal.

When the control signal supplied to control winding 181 has a predominant positive or negative half cycle like that shown in waveform 101' or 101" of FIGS. 3b and 3c, curves C, the D.-C. component of the control signal will increase the flux in the cores (not shown) of one and decrease the flux in the cores of the other of the magnetic amplifier channels. Assume, for example, that the direct-current component of control signal 101' or 101" has the effect of increasing the flux developed in the cores of gate windings 167 and 168, and decreasing the flux developed in the cores of gate windings 169 and 170. During a positive half cycle of waveform 164a developed at the upper extremity of secondary winding 162, the cores of the upper amplifier channel saturate, and abrupt current conduction through gate winding 167, diode 171 and output resistor 175 begins earlier in the positive half cycle of 164a, than is the case when the control signal does not contain the assumed D.-C. component.

However, saturation of the cores in the lower channel of amplifier 165 requires a greater flow of current through gate winding 169 to overcome the effect of the D.-C. component of the control signal. For this reason, abrupt conduction in gate winding 169 occurs later in the positive half cycle of 164a than in the case of gate winding 167 of the upper channel. Accordingly, the output pulses 166a of FIG. 3b, curve D, are of longer duration than those of the opposite-polarity pulses 166b, and the net result of the algebraic addition across the output resistors 175 and 176 is to produce a time-spaced, alternating series of pulses 166' which, when smoothed by filter 185, will be translated into the continuous-wave error signal 186', FIG. 3b, curve E.

When the direction of the D.-C. component of the control signal is reversed, the output pulses 166b, FIG. 3c, curve D, developed by the lower channel of amplifier 165 will be of longer duration than pulses 166a developed in the upper channel. As a result of this predominance of pulses 166b, the composite output pulses 166", reversed in phase with respect to pulses 166', will be developed across output resistors 175 and 176, and error signal 186" likewise will be reversed in phase with respect to signal 186'.

Although the preceding paragraphs have explained the development of only one-half cycle in the operation of magnetic amplifier 165, it should be apparent that the next half cycle is developed in a similar manner through the operation of gate windings 168 and 170, and diodes 172 and 174, when the lower extremity of secondary winding 162 becomes positive.

Current induced in the short-circuited biasing winding 180 has the effect of damping flux changes in the cores of gate windings 167, 168, 169, and 170. As explained above, the biasing winding 180 insures an extended response time, on the order of 10 seconds, for magnetic amplifier 165.

The L-C filter 185 utilizes inductors 187 and 188 coupled in series to the cathode of diode 171, and a capacitor 189, coupled between a junction common to inductors 187 and 188, and the cathode of diode 173, to integrate the output pulses 166' of magnetic-amplifier 165, introduce a 90-degree phase shift, and form one of the smooth-wave error signals 186' or 186".

The error signal 186' or 186" from filter 185 flows to the resistive bridge 190 where it combines in addition with the "in phase" push-pull component 191a or 181b (FIGS. 3b and 3c, curves E) and in subtractive relation with the other component. The resultant output of bridge 190 then becomes the servo control signal 192' or 192", FIGS. 3b and 3c, curves F.

The bridge 190 comprises a follow-up potentiometer 199 having a wiper arm 199a coupled to inductor 188 and a resistance element 199b coupled between input-terminals 195 and 196 for receiving the push-pull components of $e_s$ developed across secondary winding 163, and two series-connected resistors 193 and 194 coupled in parallel with potentiometer 191 between terminals 195 and 196. A bridge output terminal 198 is provided at a junction common to resistors 193 and 194 where servo-control signals 192' or 192" are developed.

The manner in which the error-signal 186' or 186", if any, derived from L-C filter 185 combines with the push-pull components 191a and 191b to produce one of the resultant servo-control signal 192' or 192" will be explained with reference to the waveforms of FIGS. 3b and 3c, curves E. Here, the error signal applied to the potentiometer wiper 191a is represented by the waveform 186' or 186", and the push-pull components of $e_s$ applied across the bridge input terminals 195 and 196 are represented by waveforms 191a and 191b. As shown in FIG. 3b, curve E, error-signal 186', in phase with component 191a, effectively augments the latter and produces a composite bridge input signal 197 at terminal 195 having positive half cycles of an amplitude equal to the sum of the positive half cycles of 186' and 191a. During the same interval, the positive half cycle of signal 186' effectively subtracts from the negative half cycle of the out-of-phase component 191b to produce a composite bridge input signal 201 having negative half cycles of diminished amplitude at terminal 196. During the negative half cycle of 186', the negative half cycle of 191a is augmented while the positive half cycle of 191b is reduced. In this manner composite bridge input signals 197 and 201 of differing amplitude are formed at input terminals 195 and 196, respectively, and these combine algebraically across resistors 193 and 194 to produce the servo-control signal 192' at output terminal 198.

The servo-control signal 192" is developed in a manner similar to the development of 192' as explained above, and is illustrated in FIG. 3c, curve F. The only difference between the input signals supplied to bridge 190 in order to develop servo-control signal 192″ and those supplied for developing servo-control signal 192′, is that the error signal 186″ is 180 degrees out-of-phase with error signal 186′. As explained previously, the respective phases of error signals 186′ and 186″ signifies opposite directions of deviation of the variable-frequency signal $e_s$.

The servo amplifier 200 produces electrical power for actuating servomotor 4 in one direction or the other in response to one of the servo-control signals 192′ or 192″. Inasmuch as servo amplifier 200 may be any of several conventional types well understood in the art, a detailed description of its circuitry is omitted.

The servomotor 4 is coupled mechanically to the wiper arm 199a of the follow-up potentiometer 199 via the mechanical linkage 30, and to the control element of bypass valve 5 via the mechanical linkage 31. As a result, actuation of servomotor 4 moves the wiper arm 199a of follow-up potentiometer 199 in the direction required to "erase" the error signal by restoring the balance of bridge 190. If this were not done, the length of time required for elimination of the error signal through correctional action of servomotor 4 operating on the fuel bypass valve 5 to effect a change in speed of turbine 2, would be excessive, and the result would be that the servomotor 4 would continue to operate fuel bypass valve beyond the extent required to effect speed correction and initiate regeneration oscillation of the frequency-control system. Thus, by coupling servomotor 4 to the wiper arm 199a of follow-up potentiometer 199, incremental adjustments are made to the fuel bypass valve 5 until the entire frequency error is wholly eliminated by an appropriate change in speed of turbine 2 with little or no danger of excessive correctional response and regenerative oscillation of the system.

It should be apparent from the foregoing that a frequency-control system embodying this invention is characterized by exceptional sensitivity to frequency deviations on the order of a fraction of a cycle of the frequency to be controlled, and high immunity to regenerative oscillations in the servo-control loop.

It is anticipated that the novel concepts expressed and inferable from the drawings and text of this disclosure will enable the design of a variety of embodiments within the scope of this invention, as represented in the following claims.

I claim:

1. A frequency control system comprising:
    means for generating an electrical power wave of variable frequency, and including further means for controlling the frequency of the electrical power wave;
    means coupled to the generating means for providing a product wave having a frequency equal to $n$ times the frequency of the variable-frequency wave from the generating means;
    a reference-frequency generator for producing a reference wave having a constant frequency equal to $n+1$ times a constant desired frequency;
    means coupled to the product wave providing means and to the reference-frequency generator for heterodyning the reference and product waves to produce sum and difference frequency signals;
    means coupled to the heterodyning means for translating selectively the difference frequency signal while blocking the sum frequency signal;
    means coupled to the translating means and responsive to the difference frequency signal for producing a control signal representing the direction and magnitude of deviation of the variable-frequency wave from said constant desired frequency;
    and means coupled to the control-signal producing means and to the frequency controlling means, and responsive to the control signal, for substantially maintaining the frequency of said variable-frequency wave equal to said constant desired frequency.

2. A frequency-control system comprising:
    means for generating an electrical power wave of variable frequency, and including further means for controlling the frequency of the electrical power wave;
    means coupled to the generating means for providing a product wave having a frequency which is a multiple of the frequency of the variable-frequency wave;
    a reference-frequency generator for producing a reference wave having a constant frequency differing from the frequency of the product wave by an amount approximating a selected frequency;
    means heterodyning the reference and product frequency waves to produce sum and difference signals;
    means coupled to the heterodyning means and responsive selectively to the difference signal for producing an alternating control signal having an effective direct-current component representing in term of polarity the direction and in terms of magnitude the extent of deviation of the variable-frequency wave from the selected frequency;
    and means coupled to the control-signal producing means and to the frequency controlling means and responsive to the control signal for minimizing, at least, the deviation in frequency of the variable-frequency wave from said selected frequency.

3. A frequency-control system comprising:
    a rotary alternating current generator for providing a wave of variable frequency, and including means for controlling the speed of the generator to establish a desired frequency for said wave;
    means coupled to the generator for multiplying effectively the frequency of the variable-frequency wave to produce a product wave;
    a reference-frequency source for producing a reference wave having a constant frequency differing from the frequency of the product wave by an amount approximating the desired frequency;
    means coupled to the multiplying means and to the reference-frequency source for heterodyning the reference wave and product wave to produce the sum and difference frequency signels;
    means coupled to the heterodyning means and responsive selectively to the difference signal for producing an alternating control signal having an effective direct-current component representing in terms of polarity the direction and in terms of magnitude the extent of deviation of the variable-frequency signal from the desired frequency;
    and means including a magnetic amplifier coupled to the control-signal producing means and to the generator speed control means, and responsive selectively to the effective direct-current component of the control signal for minimizing, at least, the deviations in frequency of the variable-frequency wave from said desired frequency.

4. A frequency-control system comprising:
    a rotary alternating current generator for providing a power wave of variable frequency, and including further means for controlling the speed of the generator to establish a desired frequency for said wave;
    means coupled to the generator and responsive to the variable frequency power wave for developing an alternating signal having a frequency which is a predetermined multiple of the frequency of the variable frequency wave, and having another frequency, when the variable-frequency wave is incorrect, equal to the predetermined frequency modified by a frequency component greater than the frequency deviation of the variable-frequency signal;
    means coupled to the multiple frequency alternating signal developing means and responsive to the alternating signal for producing a control signal having an alternating current component and an effective direct-current component representing the direction and magnitude of deviation of the variable-frequency signal from a correct frequency;

and means including a magnetic amplifier coupled to the control-signal producing means and to the generator speed control means, and responsive selectively to the effective direct-current components of the control signal for minimizing, at least, the deviations in frequency of the variable-frequency wave from said desired frequency.

5. A frequency-control system comprising:

a rotary alternating current generator for providing a power wave of variable frequency, and including means for controlling the speed of the generator to establish a desired frequency for said wave;

means coupled to the generator and responsive to the variable frequency power wave for developing an alternating signal having a frequency which is a predetermined multiple of the frequency of the variable-frequency wave, and having another frequency, when the variable-frequency wave is incorrect, equal to the predetermined frequency modified by a frequency component greater than the frequency deviation of the variable-frequency signal;

means including a discriminator coupled to the multiple frequency alternating signal developing means and responsive to the alternating signal for producing a control signal having an alternating current component and an effective direct-current component representing in terms of polarity the direction and in terms of magnitude the extent of deviation of the variable-frequency signal from a correct frequency;

and means including a magnetic amplifier coupled to the control-signal producing means and to the generator, and responsive selectively to the effective direct-current component of the control signal for minimizing, at least, the deviations in frequency of the variable-frequency wave from said desired frequency.

6. A frequency-control system as represented in claim 5 wherein the discriminator is a phase discriminator comprising:

an output circuit coupled to the generator speed control means;

first means for shifting the phase of alternating signals of predetermined-frequency through an angle of ninety degrees and for shifting the phases of alternating signals of other frequencies through angles greater and less than ninety degrees in accordance with a function representing variations in the direction and magnitude of deviation of the other-frequency alternating signals from the predetermined frequency;

and second means coupled to the first means, and responsive to the phase-shifted, other-frequency alternating signals, for switching time-selected fractions of the respective cycles of alternating signal to the output circuit in order to form the control signal.

7. A frequency-control system as represented in claim 6 wherein the frequency deviation minimizing means comprises:

first and second means coupled to the generator for developing two pairs of push-pull conponents of the variable-frequency wave;

a magnetic amplifier including first and second gate windings having respective output ends, and respective input ends coupled to the first means so that a first push-pull signal component is applied to the first winding and a second component is applied to the second winding, third and fourth gate windings having respective output ends, and respective input ends coupled to the first means, so that the first push-pull signal component is applied to the third gate winding and the second component is applied to the fourth gate winding, separate means coupled to the respective output ends of the first, second, third, and fourth gate windings for conducting current only in a unidirectional direction, separate means coupled between the output ends of the first and second gate windings, and between the output ends of the third and fourth gate windings for resetting one winding of each of the two pairs of gate windings while the other winding of each pair is conducting output current, a short-circuited biasing winding disposed in inductive relation to the gate windings to provide degenerative damping for the magnetic amplifier, a control winding coupled to the output circuit of the discriminator having a first section disposed in inductive relation to the first and second gate windings and a second section disposed in inductive relation to the third and fourth gate windings, so that a control signal having a direct-current component in a first direction effectively will aid unidirectional output current flow through the first and second windings while opposing the flow of unidirectional output current in the third and fourth windings, and a direct-current component of the control signal flowing through the control winding in the opposite direction will have opposite effects on the flow of unidirectional output current through the gate windings, and a push-pull output network having an output terminal coupled effectively to the respective output ends of the first and fourth gate windings, and another output terminal coupled effectively to the output end of the second and third gate windings, so that a time-spaced, width-modulated series of output pulses of alternating polarity will be produced by the magnetic amplifier in response to a direct-current component of the control signal through the control winding in one direction, and a series of amplifier output pulses of opposite phase will be produced in response to a direct-current control signal flow in the opposite direction through the control winding;

a bridge made up of a potentiometer and two series-connected impedances coupled in parallel across the second push-pull component-producing means;

a filter coupled between the push-pull output circuit of the magnetic amplifier and the wiper arm of the potentiometer for translating the amplifier output pulses into an analogous error signal, so that the latter will combine algebraically with the push-pull components of the variable-frequency signal to produce a servo-control signal at a bridge-output junction common to the series-connected impedances of the bridge;

and means including a servomotor coupled to the wiper arm of the potentiometer, to the bridge-output junction, and to the generator speed control means for controlling the latter in the direction and to the extent required to minimize, at least, the disparity between the correct and actual frequencies of the variable-frequency signal.

8. A frequency-control system as represented in claim 7 wherein the alternating-signal developing means comprises:

means coupled to the generator for multiplying effectively the frequency of the variable-frequency signal to produce a product signal;

a reference-frequency generator for producing a reference signal having a constant frequency differing from the frequency of the product signal;

means coupled to the multiplying means and to the reference-frequency generator for heterodyning the reference and product frequencies to produce sum and difference signals;

means coupled to the heterodyning means for translating selectively the difference signal while blocking the sum signal.

References Cited by the Examiner
UNITED STATES PATENTS

| 2,778,999 | 1/1957 | Warriner | 332—19 |
| 2,909,672 | 10/1959 | Emery | 307—57 |
| 3,110,817 | 11/1963 | Frederick | 322—39 |
| 3,112,678 | 2/1964 | Marlot | 290—40 |

LLOYD McCOLLUM, *Primary Examiner.*

A. H. TISCHER, *Assistant Examiner.*